UNITED STATES PATENT OFFICE.

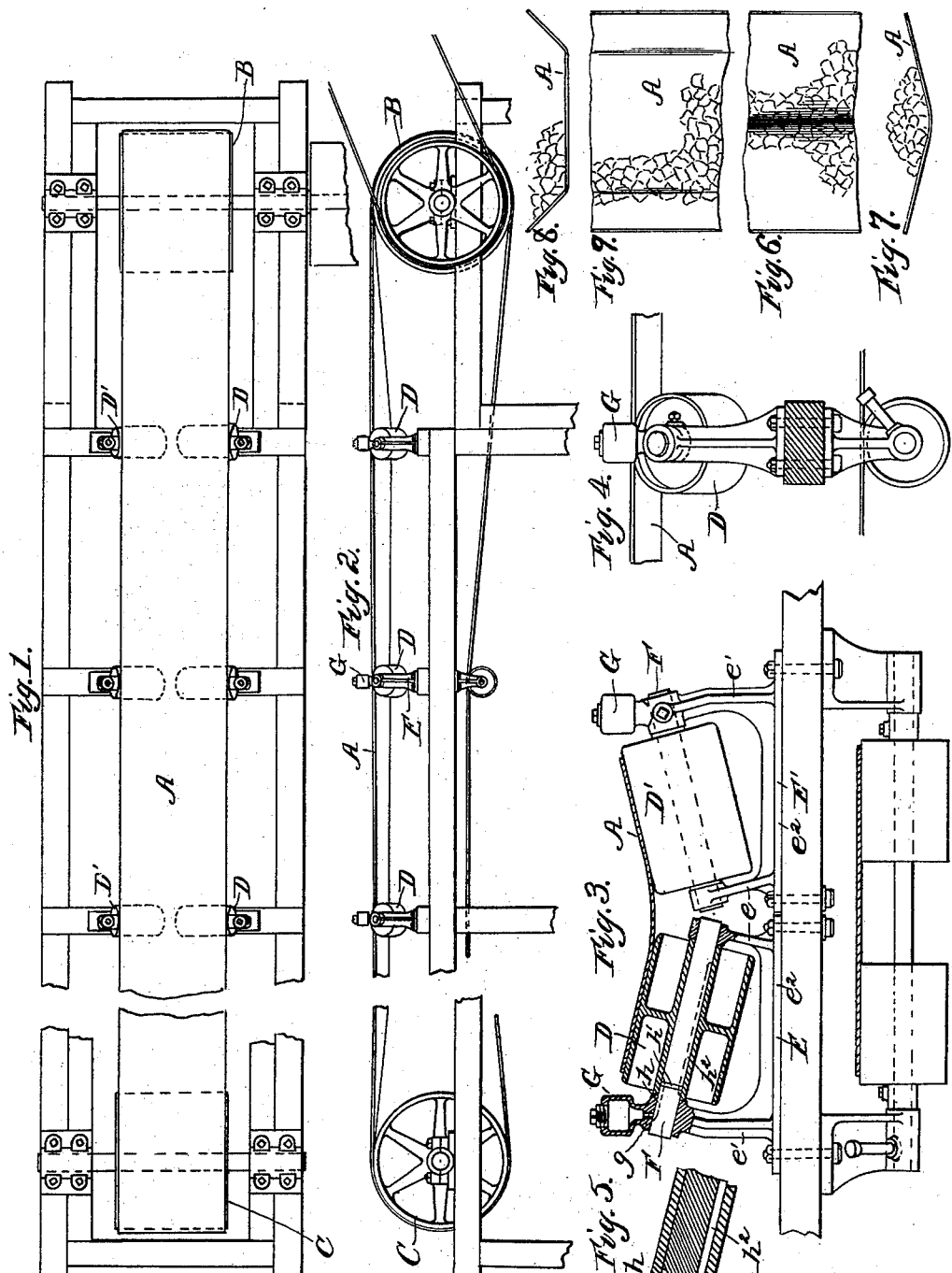

FREEMAN R. WILLSON, JR., OF COLUMBUS, OHIO, ASSIGNOR TO JOSEPH A. JEFFREY, OF SAME PLACE.

CONVEYER.

SPECIFICATION forming part of Letters Patent No. 612,939, dated October 25, 1898.

Application filed July 25, 1898. Serial No. 686,812. (No model.)

*To all whom it may concern:*

Be it known that I, FREEMAN R. WILLSON, Jr., a citizen of the United States, residing at Columbus, in the county of Franklin and State of Ohio, have invented certain new and useful Improvements in Conveyers, of which the following is a specification, reference being had therein to the accompanying drawings.

This invention relates to carriers or conveyers of the sort wherein each has an endless belt, band, or apron passing around driving and idler drums at the ends and supported at lines intermediate of the ends on rollers or pulleys.

Figure 1 is a plan view of a part of the conveyer sufficient to illustrate my improvements. Fig. 2 is a side view. Fig. 3 is a cross-section of the conveyer, showing one set of idlers partly in elevation and partly in section. Fig. 4 is an end view. Fig. 5 is a section of a part of a shaft enlarged. Figs. 6 and 7, in contrast with Figs. 8 and 9, illustrate one of the important features of the belt.

In the drawings, A indicates the conveyer or carrier belt. Generally it is composed of rubber or is formed from a composite material consisting of layers of textile fabric and layers of rubber. In this respect there can be more or less variation, as any suitable apron, band, or belt can be employed.

B indicates the driving drum or roller, and C an idler drum or roller at the opposite end of the conveyer.

At suitable distances apart and on transverse lines intermediate of the end rollers I place intermediate supporting and guiding devices. Each of these comprises a pair of pulleys or rollers D D', with which the belt contacts.

Heretofore it has been customary to support conveyer-belts of this sort in one or the other of several ways. One method was to employ a horizontal cylindrical roller for engaging with the central part of the belt and two conical rollers on a horizontal axis at the ends of the intermediate horizontal roller, as illustrated in Patent No. 373,389 to J. Creager, of November 15, 1887; but serious difficulties have been found incident to belt-supports of this character, particularly because of the difference in peripheral speeds between the central horizontal roller and the outer conical rollers of larger diameter. Those of another sort have had horizontal rollers for the central part of the belt and inclined cylindrical rollers for the edges of the belt, as illustrated in Patent No. 203,825 to T. M. Healey, dated May 2, 1878, and the said supporting-pulleys at the edge of the belt being cylindrical and mounted on inclined axes are superior to those of a conical form, inasmuch as they permit the edge parts of the belt to travel with the same speed as the central part, and there is consequently no drag or wear upon it. In still another style the intermediate central horizontal roller has been placed directly between the outer inclined cylindrical pulleys; but from my observation of and experience with conveyers or carriers of either of the last two sorts I have found that much more than the necessary power is required to propel the belt and advance the material thereon (often very heavy) because of the resistance caused by the large number of intermediate central horizontal pulleys. Moreover, the belts when supported upon the three pulleys or rollers, one horizontal and two inclined at the edges, is apt to crease, crack, and rapidly wear along the lines where it is relatively sharply turned up—that is to say, on the lines which travel through the angles between the top peripheral line of the central roller and the peripheral lines of the side inclined rollers, and this difficulty has necessitated the production and use of peculiarly-constructed belts when made of rubber—to wit, belts having a wearing-face thicker at the central portions and thinner at the side portions and a fabric portion or backing which is thicker at the edges and thinner and more flexible at one or more points nearer to the middle of the belt. I have succeeded in overcoming these difficulties and have provided a guiding-support for a belt, which I have herein shown and which permits the use of any ordinary rubber belting—that is, a form which can be cheaply and readily molded and made and having its parts of uniform cross-section throughout, if desired. I employ two relatively-elongated inclined rollers D D', which are so disposed with relation to each other and have their top surfaces at such an angle and so related to the belt that the latter is not sharply curved or concaved at any particular line, but has a substantially uniform support from edge to edge. I so arrange and proportion these rollers that I can dispense entirely with any horizontal intermediate support. The inner ends of the rollers are somewhat remote from each other, and yet so placed as to give to the central part of the belt the required and proper support. By not having the belt positively contact with the rollers at its central part I can insure that it shall have the requisite "draw" and tend to maintain its central position under the influence of the load. Having thus relatively elongated the inclined rollers and increased their work in comparison with the relatively-shorter ones heretofore used, I combine with them supports of a novel character—that is to say, instead of mounting them upon shafts each held at one end only in a bracket or standard I employ standards E E', each having a short leg $e$ for the lower inner end of the shaft F and a longer leg $e'$ for a higher outer end and a connecting-base $e^2$. The two rollers can be thus mounted independently of each other and each can be adjusted as required. The carrying-belts vary in width over a limited number of inches—say from eighteen to twenty-four inches—and the rollers and standards described and shown can be so proportioned as to be adapted for any of several widths of belt. By supporting the shaft at each end it can be made of lighter steel than has been heretofore permissible, and yet be strong enough to sustain a heavy load. Moreover, provision is made for readily oiling the roller or pulley hub by devices supported independently of the inclined shaft. The outer leg $e'$ of the standard being present permits me to cast therewith the oil-cup G, whose chamber has connection through an aperture at $g$ with the lubricating-channel of the shaft. The latter consists of an upper part $h$, an annular duct $h'$, and a longitudinal duct $h^2$, extending along the under side. The oil passes from the cup downward through the upper duct $h$, thence through the annular one at $h'$, and is uniformly distributed along the under side of the shaft at places where it is relieved of pressure, so that the oil can escape with sufficient freedom.

It will be seen that the belt is so held as to curve upward and outward from the very central longitudinal line—that is to say, so that the load-carrying cavity is lowest at the center of the belt. As a consequence the load at all points longitudinally tends to seek the center, and therefore the draft is uniform from side to side of the belt. This is illustrated in Figs. 6 and 7. The spouts or chutes which deliver the load to the belt are apt to deliver the load more or less irregularly—that is to say, there will at times be a smaller stream and at others heavier charges dropping. In my construction, as above stated, these always tend to seek and ride along on the central part of the belt. Figs. 8 and 9, on the contrary, show the tendency when use is made of belts which have a relatively flat central portion supported on cylindrical rollers—namely, the tendency for the material to ride sometimes on one side and sometimes on another of the center, causing an inequality in the draft along the different lines.

The mechanism for driving such conveyers is well known, and the method of operation also, and it is therefore not necessary to here present them at length.

What I claim is—

1. A guide and supporting device for a rubber or flexible belt, having two relatively-elongated, cylindrical pulleys, both inclined to the horizontal and having their inner ends approximately close together, in combination with a standard for each of said rollers or pulleys having the shorter leg $e$ for the lower, inner end of the roller or pulley and the longer leg $e'$ for the outer, higher end, said rollers or pulleys being adapted to support the entire weight of the belt, substantially as described.

2. In a conveyer, the combination with a rubber or flexible belt adapted to have its longitudinal central portion depressed relative to its edges, of cylindrical horizontal driving and guiding rollers or pulleys at the ends of the conveyer, and the supporting and guiding device intermediate of said ends having two cylindrical rollers or pulleys inclined to the horizontal, with their inner ends relatively close together but somewhat remote from each other, whereby the central part of the belt is allowed to conform itself to a curved shape, an inclined shaft for each of said pulleys or rollers, a bearing for each end of each shaft, and a support for the bearings of one shaft independent of the support for the other, substantially as set forth.

In testimony whereof I affix my signature in presence of two witnesses.

FREEMAN R. WILLSON, JR.

Witnesses:
JNO. J. REILLY,
F. E. COLTON.